March 24, 1925.

H. W. TURNER 1,531,259

INSULATED CONDUCTOR AND METHOD OF MAKING SAME

Filed March 5, 1921

Inventor:
Harry W. Turner,
Albert G. Davis
by His Attorney.

Patented Mar. 24, 1925.

1,531,259

UNITED STATES PATENT OFFICE.

HARRY W. TURNER, OF SCHENECTADY, NEW YORK, ASSIGNOR TO GENERAL ELECTRIC COMPANY, A CORPORATION OF NEW YORK.

INSULATED CONDUCTOR AND METHOD OF MAKING SAME.

Application filed March 5, 1921. Serial No. 449,943.

*To all whom it may concern:*

Be it known that I, HARRY W. TURNER, a citizen of the United States, residing at Schenectady, county of Schenectady, State of New York, have invented certain new and useful Improvements in Insulated Conductors and Methods of Making Same, of which the following is a specification.

The present invention comprises a new insulation for electrical conductors such as magnet wires and the method of its application. The insulation prepared in accordance with my invention is extraordinarily resistant to high temperature even when containing textile fibres such as cotton. Other advantages of my invention are the moisture and acid repellant property of my improved insulation.

Although the benefits of my invention are not confined to conductors previously covered with fibrous material, I have found it to be particularly valuable for the treatment of cotton covered wire, the cotton having been applied in any convenient manner, that is, as multiple strands or as felted fibres.

Figure 1:
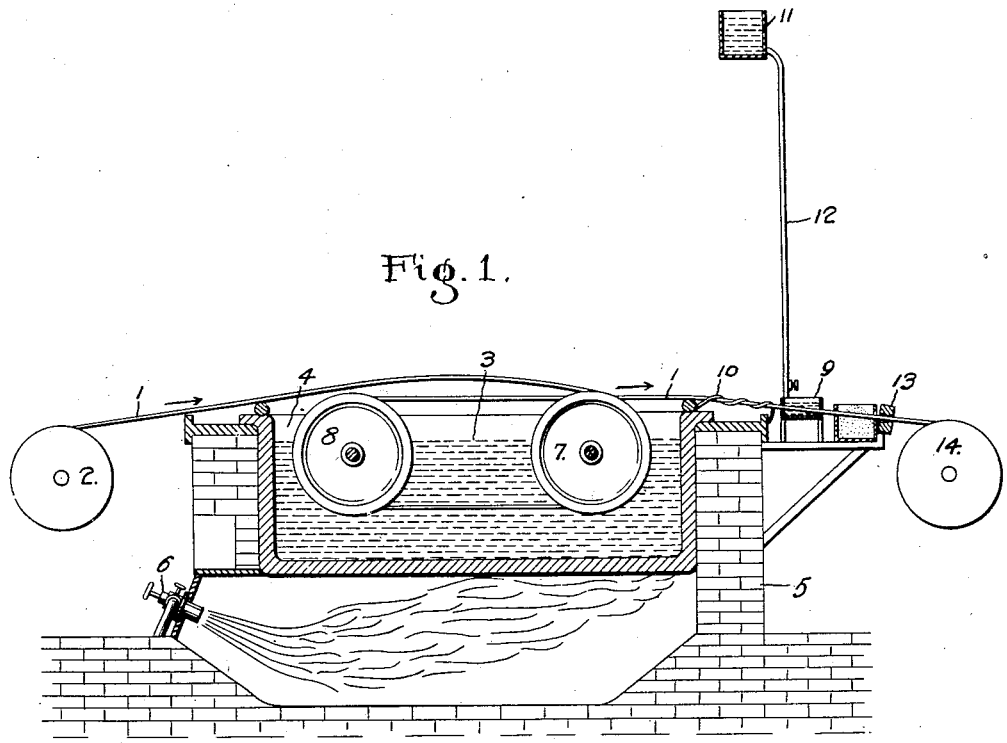
Figure 2:
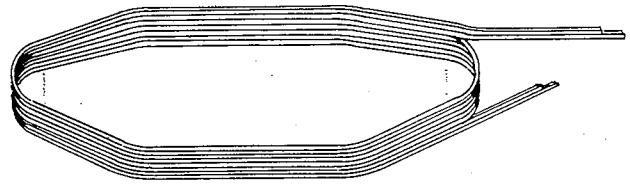

The accompanying drawing in Fig. 1 illustrates somewhat diagrammatically an apparatus suitable for carrying out my invention, and Fig. 2 illustrates an electrical winding embodying my invention.

Prior to my invention it has been customary to impregnate electrical coils, made of fabric-covered wire, by first winding the wire into coils and then immersing the coil as a whole into an insulating liquid, for example, a varnish. In accordance with my invention, a more perfect saturation of the cotton, or other fabric, is obtained by passing magnet wire prior to coiling, through a bath of insulating liquid maintained at a temperature high enough to completely eliminate air and moisture, for example, a temperature of at least 500° F.

Referring to the drawing, cotton-covered wire 1 from a reel 2 is led into a mass 3 of bituminous material, such as asphalt, contained in a tank 4, supported on a masonry base 5. The tank 4 and its contents are heated in any suitable way, as by the combustion of gas or oil or by electrical heating, a burner 6 being shown for illustrative purposes. Conveniently the wire 1 is led over rotatable reels or guides 7 and 8 in such a way as to be passed through the heated asphalt, the wire passing first over the reel 7, then under the reel 8 and from thence out of the tank. Preferably the asphalt is maintained at a relatively high temperature, say about 500° F. (260° C.). At this temperature the residual moisture and air are first boiled out of the cotton and the viscosity of the asphaltum is so low that the interstices between the fibres and even the structures of the fibres are penetrated and filled with a dense substance that effectively prevents the reentrance of moisture and air.

While the wire is still hot it is led into a bath of coagulable vegetable oil, as for example, China wood oil contained in a pan or trough 9. A wiper 10, preferably is provided between the tank 4 and the pan 9 to remove any excess of asphaltum clinging to the wire. The pan 9 may be connected with a supply tank 11 by a pipe 12. The high temperature of the wire causes an immediate coagulation of the China wood oil upon the surface of the wire, thereby producing a surface more repellant to fluids, such as water, acids, mineral oil, and the like. The oil blends with the granular particles of asphalt to form a varnish. In order to render the surface of the inspissated oil free from tackiness, the coated wire is passed through a finely-divided mineral material, for example, powdered talc. The insulation may be condensed and the surface may be still further smoothed and condensed to a minimum space by running the wire through a die 13. It is finally wound upon a reel 14.

Coils made of wire, as shown in Fig. 2 treated in this way, have been exposed to temperatures as high as about 300 to 400° F. for hours without damaging the insulation, and in fact, may be heated to a temperature of 900° F., and even higher, for a few minutes without adversely affecting the insulating value of the insulation. This most extraordinary resistance to heating of the cotton covering appears to be due to the thorough elimination of air in the interstices of the cotton, and the effective sealing of the fibres out of contact with the atmosphere. The described treatment makes wires insulated in accordance with my invention substantially non-combustible under operating conditions. Cotton covered wires so treated as described have their current carrying capacity increased and will operate at much lower temperature than untreated cotton covered wires with a given load.

Apparently the compactness of the insulation particularly in electrical windings increases the heat dissipating capacity of the wire, due to the absence of intersticial air.

What I claim as new and desire to secure by Letters Patent of the United States, is,—

1. The method of preparing electrical winding of fabric-insulated conductors which consists in passing a fibrous coated conductor into a bath of insulating liquid maintained at a temperature high enough to eliminate air and moisture from the fibrous coating, applying a coagulable oil, and thereupon coiling the conductor into electrical windings.

2. The steps in the process of impregnating a fabric coated conductor which consists in leading said conductor through a bath of molten asphalt and thereupon leading said conductor through a coagulable oil while said conductor is at a temperature high enough to coagulate said oil.

3. The steps in the process of impregnating a fabric coated conductor which consist in leading said conductor through a bath of asphalt heated to a temperature of about 500° F. and thereupon while said conductor is still heated leading the same through a bath of China wood oil.

4. A conducting wire covered with fibrous material impregnated with asphalt and China wood oil.

5. Magnet wire covered with textile fibres and asphaltic material and China wood oil filling and coating said fibres.

6. Magnet wire covered with cotton, asphalt and China wood oil filling and coating said cotton fibres, and an inert filler imbedded in said covering, said conductor being operable at a temperature of about 300 to 400° F.

7. A coil or winding for electrical apparatus comprising a conductor covered with textile fibres containing asphaltic material and a coagulable vegetable oil, said coil being operable at temperatures of about 300 to 400° F.

8. An electrical coil operable at temperatures of 300 to 400° F. comprising conductors covered with a textile fibre wrapping impregnated with asphaltic material and a coagulable oil the structure of said fibres being filled therewith.

9. The method of impregnating fibres with a solid insulating material and a coagulable oil which consists in first applying said insulating material at a temperature high enough to thinly liquefy it and coagulate said oil were it mixed therewith, and then applying said oil while the temperature is high enough to coagulate it.

In witness whereof, I have hereunto set my hand this 3rd day of March, 1921.

HARRY W. TURNER.